United States Patent
Alieiev et al.

(10) Patent No.: US 12,021,575 B2
(45) Date of Patent: Jun. 25, 2024

(54) METHOD FOR PREDICTIVELY ESTIMATING THE TRANSMISSION CONDITIONS FOR A COMMUNICATION BETWEEN TWO COMMUNICATION PARTNERS, DEVICE FOR CARRYING OUT THE METHOD STEPS OF THE METHOD, VEHICLE AND COMPUTER PROGRAM

(71) Applicant: VOLKSWAGEN AKTIENGESELLSCHAFT, Wolfsburg (DE)

(72) Inventors: Roman Alieiev, Stendal (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 524 days.

(21) Appl. No.: 17/271,644

(22) PCT Filed: Sep. 3, 2019

(86) PCT No.: PCT/EP2019/073393
§ 371 (c)(1),
(2) Date: Feb. 26, 2021

(87) PCT Pub. No.: WO2020/048943
PCT Pub. Date: Mar. 12, 2020

(65) Prior Publication Data
US 2021/0328694 A1 Oct. 21, 2021

(30) Foreign Application Priority Data
Sep. 4, 2018 (EP) .................................... 18192367

(51) Int. Cl.
*H04B 17/373* (2015.01)
*H04B 17/26* (2015.01)
*H04W 4/46* (2018.01)

(52) U.S. Cl.
CPC ........... *H04B 17/373* (2015.01); *H04B 17/26* (2015.01); *H04W 4/46* (2018.02)

(58) Field of Classification Search
CPC ....... H04B 17/373; H04B 17/26; H04W 4/46; H04L 67/12
See application file for complete search history.

(56) References Cited

U.S. PATENT DOCUMENTS

| 7,427,929 B2 * | 9/2008 | Bauer ..................... G08G 1/162 340/471 |
| 7,720,026 B2 * | 5/2010 | Chen ....................... H04L 61/00 455/446 |

(Continued)

FOREIGN PATENT DOCUMENTS

| CN | 102624896 A | 8/2012 |
| CN | 107545756 A | 1/2018 |

(Continued)

OTHER PUBLICATIONS

3GPP; ETSI TS 136 213; LTE; Evolved Universal Terrestrial Radio Access (E-UTRA); Physical layer procedures; 3GPP TS 36.213; May 2016; version 13.0.0; Release 13.

(Continued)

*Primary Examiner* — Redentor Pasia
(74) *Attorney, Agent, or Firm* — Barnes & Thornburg LLP

(57) ABSTRACT

A method for predictively estimating the transmission conditions for a communication between two communication partners traveling along a roadway, wherein the communication partners themselves estimate the current transmission conditions. The communication partners use the estimated transmission conditions of a number of preceding communication partners to better estimate the transmission conditions for a future time. The communication partners themselves also estimate the transmission conditions for the (Continued)

future time based on a sensor-based detection of the surroundings and merging the estimation results obtained in this way with the results obtained from the preceding transportation vehicles.

20 Claims, 4 Drawing Sheets

(56) References Cited

U.S. PATENT DOCUMENTS

| | | | |
|---|---|---|---|
| 9,403,482 B2* | 8/2016 | Shahraray | H04W 4/70 |
| 9,491,684 B2 | 11/2016 | Cordeiro de Oliveira Barros et al. | |
| 9,807,566 B2 | 10/2017 | Alieiev et al. | |
| 10,089,876 B1* | 10/2018 | Ramasamy | G05D 1/028 |
| 10,109,195 B2* | 10/2018 | Gordon | B60W 40/02 |
| 10,365,364 B1* | 7/2019 | Prados | G01S 13/931 |
| 10,388,082 B2 | 8/2019 | Alieiev et al. | |
| 10,486,701 B2 | 11/2019 | Yamamoto | |
| 10,621,869 B2* | 4/2020 | Yamamoto | G08G 1/096725 |
| 10,991,242 B2* | 4/2021 | Taylor | H04Q 9/00 |
| 11,242,051 B1* | 2/2022 | Konrardy | G08G 1/096791 |
| 2013/0030687 A1* | 1/2013 | Shida | G01S 5/0072 701/301 |
| 2013/0147638 A1* | 6/2013 | Ricci | G06F 21/121 340/905 |
| 2014/0104077 A1* | 4/2014 | Engel | G08G 1/0175 340/901 |
| 2015/0284010 A1* | 10/2015 | Beardsley | G08G 1/096816 701/1 |
| 2016/0071418 A1* | 3/2016 | Oshida | B60W 30/165 701/23 |
| 2017/0080952 A1* | 3/2017 | Gupta | G08G 1/167 |
| 2017/0330461 A1* | 11/2017 | Caveney | G08G 1/166 |
| 2018/0061236 A1* | 3/2018 | Yamamoto | G08G 1/096741 |
| 2018/0079419 A1* | 3/2018 | Yamamoto | H04W 4/46 |
| 2018/0157262 A1* | 6/2018 | Ao | G05D 1/0257 |
| 2018/0284266 A1* | 10/2018 | Talamonti | B60W 50/14 |
| 2019/0246303 A1 | 8/2019 | Alieiev et al. | |
| 2020/0064483 A1* | 2/2020 | Li | G01S 7/4026 |

FOREIGN PATENT DOCUMENTS

| | | |
|---|---|---|
| DE | 102014203805 A1 | 9/2015 |
| DE | 102015214968 A1 | 2/2017 |
| DE | 102017204326 A1 | 4/2018 |
| EP | 2789139 A1 | 10/2014 |
| WO | 2016147622 A1 | 9/2016 |
| WO | 2017035516 A1 | 3/2017 |

OTHER PUBLICATIONS

Alieiev et al.; Sensor-Based Predictive Communication for Highly Dynamic Multi-Hop Vehicular Networks; 2017 25th European Signal Processing Conference (EUSIPCO); 2017.
Jornod et al.; Environment-Aware Communications for Cooperative Collision Avoidance Applications; 2018 IEEE 19th International Symposium on "A World of Wireless, Mobile and Multimedia Networks" (WOWMOM); Jun. 12, 2018; pp. 588-599.
Search Report for International Patent Application No. PCT/EP2019/073393; Oct. 21, 2019.
Office Action; Chinese Patent Application No. 201980057828.1; Nov. 30, 2023.

* cited by examiner

METHOD FOR PREDICTIVELY ESTIMATING THE TRANSMISSION CONDITIONS FOR A COMMUNICATION BETWEEN TWO COMMUNICATION PARTNERS, DEVICE FOR CARRYING OUT THE METHOD STEPS OF THE METHOD, VEHICLE AND COMPUTER PROGRAM

PRIORITY CLAIM

This patent application is a U.S. National Phase of International Patent Application No. PCT/EP2019/073393, filed 3 Sep. 2019, which claims priority to European Patent Application No. 18192367.3, filed 4 Sep. 2018, the disclosures of which are incorporated herein by reference in their entireties.

SUMMARY

Illustrative embodiments relate to a method for predictively estimating the transmission conditions for a communication between two communication partners, a corresponding device for carrying out the method, a transportation vehicle and a computer program The method can be used, in particular, to predict the transmission conditions for a planned direct vehicle communication.

BRIEF DESCRIPTION OF THE DRAWINGS

Disclosed embodiments are shown in the drawings and are explained in detail below with reference to the figures. In which.

DETAILED DESCRIPTION

Figure 1:
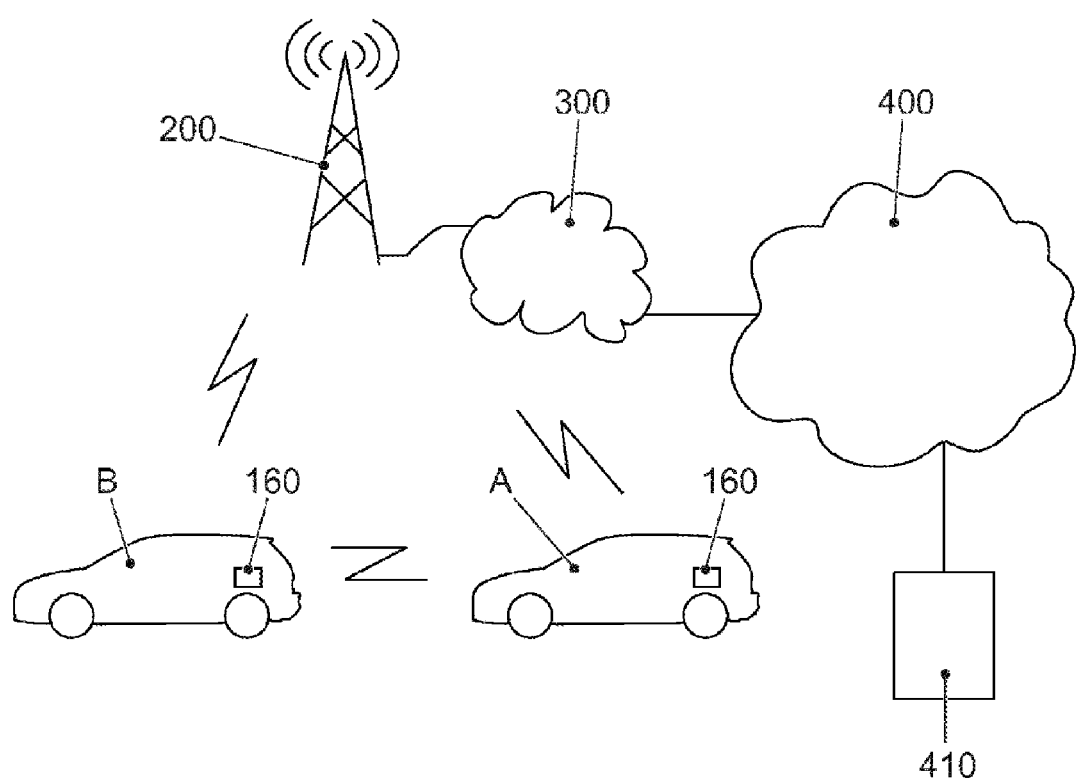
FIG. 1 shows the principle of vehicle-to-vehicle communication between two transportation vehicles which are moving one behind the other on a road and communicate with one another via a sidelink channel of a mobile radiocommunication system.

Very high reliability is very important for the scenario of transportation vehicles which are equipped with wireless communication modules which communicate directly with one another on public roads, whether it be for a cooperative or autonomous driving scenario. Technologies for direct vehicle-to-vehicle (V2V) communication have been developed and continue to be developed. Direct vehicle communication via WLAN can be cited as an example. The local option according to the IEEE 802.11p WLAN standard, for example, is being developed for V2V communication. Ad hoc radiocommunication networks are configured according to this technology for communication between transportation vehicles (communication in the "ad hoc domain").

However, vehicle communication is also possible in the mobile radiocommunication networks domain. Here, the term "mobile communication network" means a provider-based mobile communication network, in other words a centralized and managed mobile network. Another term for a mobile communication network is a mobile communication system, and the two terms are used synonymously in this document. With this technology, the network is divided into mobile radiocommunication cells to which a base station which supplies the mobile radiocommunication cell is assigned in each case. The individual users are registered with the base station. Specific communication resources are allocated to them on which they can exchange data with the base station. Direct vehicle-to-vehicle communication has been enabled since the 4th mobile radiocommunication generation. Here, the transportation vehicles communicate directly with one another. However, the base station is responsible for managing the communication resources which are used for vehicle-to-vehicle communication. This is the field in which the communication takes place in the "infrastructure domain". In Long Term Evolution (LTE) technology, this option is known as LTE V (for transportation vehicle), and in the 5G initiative this option is known as device-to-device (D2D) communication. This is also the field of vehicle communication with which the present disclosure is concerned.

Typical communication scenarios for vehicle-to-vehicle communication are safety scenarios, traffic efficiency and infotainment scenarios. In the safety domain, the following example scenarios can be mentioned: "cooperative forward collision warning", "pre-crash detection/warning", "high-density platooning". In these areas, transportation vehicles exchange information with one another, such as position, direction of movement and speed, and also parameters such as size and weight. Other information important for the transmission includes, e.g., intention information, such as "vehicle intends to overtake", "vehicle is turning left/right", etc., which is relevant to cooperative driving. Sensor data are often transmitted here. If a danger is present and the driver does not react, the transportation vehicle could automatically slow down so that an accident is prevented or at least the consequences of the unavoidable accident are minimized. In the area of platooning, this concerns driving in a convoy, wherein messages are also exchanged. The entire convoy is typically controlled from a transportation vehicle configured as the lead transportation vehicle. Feedback of information, for example, relating to an intended braking maneuver is planned from the front to the back to avoid rear-end collisions.

A wide area of communication for entertainment purposes also exists, where Internet access is of primary importance. Internet access is important for a multiplicity of multimedia services.

The following mobile communication technologies are currently applicable: 3GPP-based UMTS, HSPA, LTE and the upcoming 5G standards. LTE V and 5G D2D can be mentioned in connection with direct V2V communication.

The listing indicates that time-critical data transmissions take place, particularly for safety-critical communication. Conversely, stringent requirements for functional safety exist in the case of time-critical safety scenarios. These often prohibit the extensive use of technologies which are based on time-critical data transmissions.

Approaches exist which attempt to improve the stability of time-critical data transmissions. One approach relates to the concept of "sensor-aware predictive communication". This approach is based on the existence of detailed knowledge of the surroundings in which the planned communication takes place. It is relevant to know whether the communication is impaired by static or dynamic signal scatter. The surroundings are monitored with on-board environment-monitoring sensors.

A different approach relates to the concept of Agile Quality of Service Adaptation (AQoSA). This concept relates to a loop in which the application defines its QoS requirements in terms of the communication reliability of the communication system, the communication system responds to this and notifies the application how it estimates the QoS conditions for the desired time period. The application then has time to adjust its settings according to the notified QoS conditions. It can then still carry out the planned safety-critical operation with the appropriate settings. The loop is then passed through in each case for a further segment. Although the AQoSA concept was intended primarily for normal cellular mobile radiocommunication (uplink, downlink), it is nevertheless also usable for sidelink communication. Here, however, the communication partners (transportation vehicles) communicate with one another. The QoS requirement is then not sent to the base station, but directly to one or more transportation vehicles. The technology then offers a benefit if the QoS conditions can be estimated reliably enough with a prediction timeline in the order of one second or more.

In the more recent mobile communication standards (3GPP Release 12 and higher, i.e., LTE-V and the upcoming 5G mobile radiocommunication generation), the cellular concept is broadened to enable direct vehicle-to-vehicle communication (sidelink communication).

In mobile communication, resource management is a very important facet for achieving efficient multiple access schemes. As soon as periodically recurring data have to be transmitted, it is more efficient to allocate transmission resources for the transmission of these data and to allocate transmission resources to the transmitting station. In present-day mobile radiocommunication standards, this task is assigned to an administration unit which is also known as a "scheduler". This administration unit is typically arranged in the base station of a mobile communication cell. In the LTE mobile communication system, the base station is referred to as the "evolved Node Basis", or eNodeB for short. This scheduling of the mobile radiocommunication operator determines which frequency resource can be used at which time for direct communication.

The scheduler is normally a software component in the base station and informs each user of the time and frequencies of the transmission frame at which it is allowed to transmit specific data. Its main task consists in the equitable distribution of the transmission resources among the different users. Collisions are thus avoided in both transmission directions from a user (uplink) and to a user (downlink) and traffic is regulated, thus enabling more efficient access to a multiplicity of users.

However, the transmission conditions may fluctuate substantially from time to time, all the more so given that vehicle-to-vehicle communication is a highly dynamic process. The transportation vehicles are mobile and the surroundings change constantly. The distances between the communication partners change continuously. Traffic density plays a part and similarly changes continuously. It may thus occur that, from one moment to the next, the two transportation vehicles which were previously still able to communicate using line-of-sight connections have one or more transportation vehicles between them which are similarly communicating. The transmission conditions therefore change continuously. The aim is to improve the estimation of the transmission conditions in advance for safety-critical applications.

Various methods already exist for instant channel estimation. The Least Square Estimation (LSE) and Minimum Mean Square Estimation (MMSE) can be mentioned as examples. Channel Prediction (CP)-based methods can be cited as further examples. In the CP-based methods, the channel prediction is normally projected into the future on the basis of simple extrapolation of present and historical estimated values. Some approaches also take into account the characteristics of the channel statistics to make the prediction more reliable. A further problem is that, e.g., the accuracy in the use of spline interpolation calculation methods depends to a high degree on the dynamics of the surrounding conditions.

More recent sensor-based channel estimation approaches also exist which monitor the surrounding conditions also and draw conclusions therefrom relating to the occurrence of static or dynamic reflections to thus predict the channel conditions more accurately. With these methods, a more accurate channel estimation is achieved and a relative short-term channel prediction can be made. However, the accuracy of this prediction is linked to the environment monitoring with the sensors that are used, and to the ability of the system to project the position of the correctly detected object into the future.

The two first-mentioned methods are based on in situ measurements which do not, however, allow the future transmission conditions for two communication partners which are moving constantly to be estimated with high precision.

DE 10 2015 214 968 A1 discloses how the influence of the environment is also taken into account for a more accurate estimation of the channel quality in vehicle-to-vehicle communication. Reflections can occur, for example, on large buildings, resulting in multipath reception. The speed of the mobile user is determined and a motion vector is defined therefrom. The position of the mobile user is then estimated for a future time t1. With the use of an environment model, this allows an improved accuracy in the estimation of the channel quality at time t1.

EP 2 789 139 B1 discloses a method for multi-hop forwarding of data packets in vehicle ad hoc networks. Each node knows both its own coordinates and the geographical coordinates of the destination. The coordinates of the communication partners which are only one hop apart are obtained from periodically transmitted cooperative awareness messages (CAMs).

Disclosed embodiments find a solution to the problem of estimating the transmission conditions more accurately in advance for safety-critical applications in the field of vehicle-to-vehicle communication. The solution is intended primarily to meet the safety requirements.

This is achieved by a method for predictively estimating the transmission conditions for a communication between two communication partners, a device for carrying out the method, a transportation vehicle and a computer program.

To solve the problem, it is proposed to observe the traffic flow and obtain a prediction of future channel conditions by using the channel estimation results of communication partners driving in front for estimating the future channel conditions. The channel estimation result of a communication partner can be used here. However, the channel estimation results of a plurality of communication partners can also be used.

In the proposed method for predictively estimating the transmission conditions for a communication between two communication partners moving along a road, the communication partners themselves in each case estimate the present transmission conditions and use the estimated transmission conditions of communication partners driving in front to estimate the transmission conditions for a future time. This enables the accuracy of the predictive estimation of the transmission conditions to be increased. The method is usable above all in situations in which a relatively homogeneous traffic flow exists or in cases where a planned vehicle-to-vehicle communication is used. In the situation of a homogeneous traffic flow, transportation vehicles frequently travel at a similar distance from one another. A notable example in which planned vehicle-to-vehicle communications are used is the application of platooning.

This method can be refined and extended through different measures. In at least one disclosed embodiment, at least one of the following communication partners performs an operation of sensor-based monitoring of the surroundings and determines whether similar boundary conditions exist for direct vehicle communication between the communication partners driving in front. In at least one disclosed embodiment, it is taken into account whether the communication partners driving in front are travelling at a similar distance to the two following communication partners. This is appropriate since the transmission conditions can actually vary very substantially with the distance between the communication partners.

It is beneficial for the method if one of the communication partners prompts at least one of the communication partners driving in front in a request message to report the present transmission conditions which it has estimated to the following communication partners if it has been determined that the communication partners driving in front at least satisfy the distance condition. The measurement results of communication partners driving in front can thus be selected in a targeted manner.

In a different exemplary embodiment, one of the communication partners driving in front reports at least the estimated present transmission conditions periodically to the following communication partners. This can be done by way of a broadcast transmission mode. The following communication partners receive reports here without a prompt having to be sent. The corresponding administrative cost of sending request messages and replies thereto is eliminated. However, it is more difficult to make appropriate selections from the plethora of reports and more data traffic is generated for the direct vehicle communication.

In at least one exemplary embodiment, at least the distance to the communication partners driving in front is determined by a communication partner following sensor-based monitoring and a time for which the transmission conditions are predicted is calculated therefrom. As a result, the following transportation vehicles will be at an identical/similar position at this time and comparable transmission conditions will prevail, since at least the static surrounding objects will be located at an identical/similar position.

In a further improvement of the method, possible problems with signal scatter are determined by one of the communication partners following the sensor-based monitoring of the surroundings and the future transmission conditions are estimated taking into account the signal backscatter. This is particularly beneficial since the individual vehicle-to-vehicle communication can be impaired by such signal reflections. This can result in multipath reception and possible signal loss.

For a further increase in accuracy, it is highly beneficial if the communication partners merge the transmission conditions which they themselves have estimated with the transmission conditions reported by the communication partners driving in front. This involves the use of data fusion, which is suitable for increasing accuracy by integrating information from different independent sources.

It is further beneficial here if the communication partner itself estimates the transmission conditions multiple times in succession and checks before the merging operation whether the future transmission conditions which it has itself estimated multiple times converge, and similarly checks whether the transmission conditions reported multiple times in succession by the communication partners driving in front converge and the merging operation is then carried out if the estimation results converge in both cases. This enables a preliminary test which supplies information indicating whether the computing-intensive operation of the data fusion will be helpful in improving the prediction accuracy. If the measurement sequences do not converge, the data fusion can be omitted.

For a device to carry out the method according to the proposal, it is beneficial if the device is equipped with at least one processor device which is configured to carry out the corresponding method operations. A device is designed in such a way that it can carry out at least the necessary method operations from the perspective of a communication partner. In a different exemplary embodiment, the device is designed in such a way that it can carry out the operations of a communication partner not only from the transportation vehicles driving in front but also from the following transportation vehicles.

A further disclosed embodiment consists in a transportation vehicle which has a corresponding device to carry out the method.

The proposal can further be implemented as a computer program. This computer program has a program code which is executed in a processor device and carries out the method operations of the claimed method.

The present description illustrates the principles of the disclosure. Persons skilled in the art will therefore obviously be capable of designing a variety of arrangements which are not explicitly described here, but embody principles of the disclosure and are similarly intended to be fully protected.

The elements defined in the claims which are expressed as a method or mechanism for performing a specified function are intended to comprise any type of performance of this function including, for example, a) a combination of circuit elements which perform this function, or b) software in any form, including firmware, microcode or the like, combined with suitable circuits to execute this software to perform the function.

FIG. 1 shows the system architecture for implementing a vehicle-to-vehicle communication via a sidelink transmission channel provided by a mobile radiocommunication system. The reference number 200 denotes an eNodeB (evolved Node Basis) base station of an LTE mobile communication service provider.

The base station 200 in FIG. 1 is positioned close to a main road on which transportation vehicles are driving. Two transportation vehicles A and B are shown which are driving along on a lane of a road at a distance one behind the other. Passenger transportation vehicles are shown, but any other vehicles are also possible. Examples of further vehicles are: buses, goods vehicles, in particular, trucks, motorcycles, agricultural vehicles, construction vehicles, rail vehicles, including robots and drones, etc. The use of the disclosed embodiments would generally be possible in the case of agricultural vehicles, rail vehicles, watercraft and aircraft.

FIG. 1 shows both direct vehicle-to-vehicle communication via a sidelink channel and conventional mobile radiocommunication in an uplink and downlink direction via the mobile radiocommunication base station 200 and further via the communication network of the mobile radiocommunication operator 300 which is referred to in the case of LTE as the Evolved Packet Core EPC. The Internet 400 is furthermore also incorporated via the routing technology, so that a communication with an external central computer unit 400 accessible on the Internet is also possible.

In LTE terminology, a mobile terminal device corresponds to a user equipment UE which enables a user to access network services, wherein it is connected via the radio interface to the UTRAN or E-UTRAN. A user equipment of this type typically corresponds to a smartphone. User equipments also exist which are installed in transportation vehicles. The transportation vehicles are equipped with an on-board-connectivity unit 160 (OCU) for this purpose, as shown in FIG. 1. This on-board-connectivity unit 31 corresponds to an LTE communication module with which the transportation vehicle can receive mobile data and can transmit such data.

The base stations are connected via an Si interface to the EPC 300. The different interfaces of the LTE network architecture are standardized. Reference is made, in particular, to the different LTE specifications which are publicly available.

Mobile radiocommunication technologies of this type are standardized and reference is made here to the corresponding specifications of mobile radiocommunication standards. The 3GPP initiative and the LTE (Long Term Evolution) standard are cited here as a modern example of a mobile radiocommunication standard. Many of the associated ETSI specifications are currently available in version 14. The following can be mentioned as an example from version 13: ETSI TS 136 213 V13.0.0 (2016-05); this involves Evolved Universal Terrestrial Radio Access (E-UTRA); Physical Layer (3GPP TS 36.213 Version 13.0.0 Release 13).

LTE represents high data rates and short response times. The increase in the data rate is achieved in LTE through improved modulation methods, more flexible frequency usage and wider channel bandwidths. According to the specification, LTE currently has a data rate of more than 300 Mbit/s in the downlink and 75 Mbit/s in the uplink per 20 MHz band, mathematically and less overhead.

Figure 2:
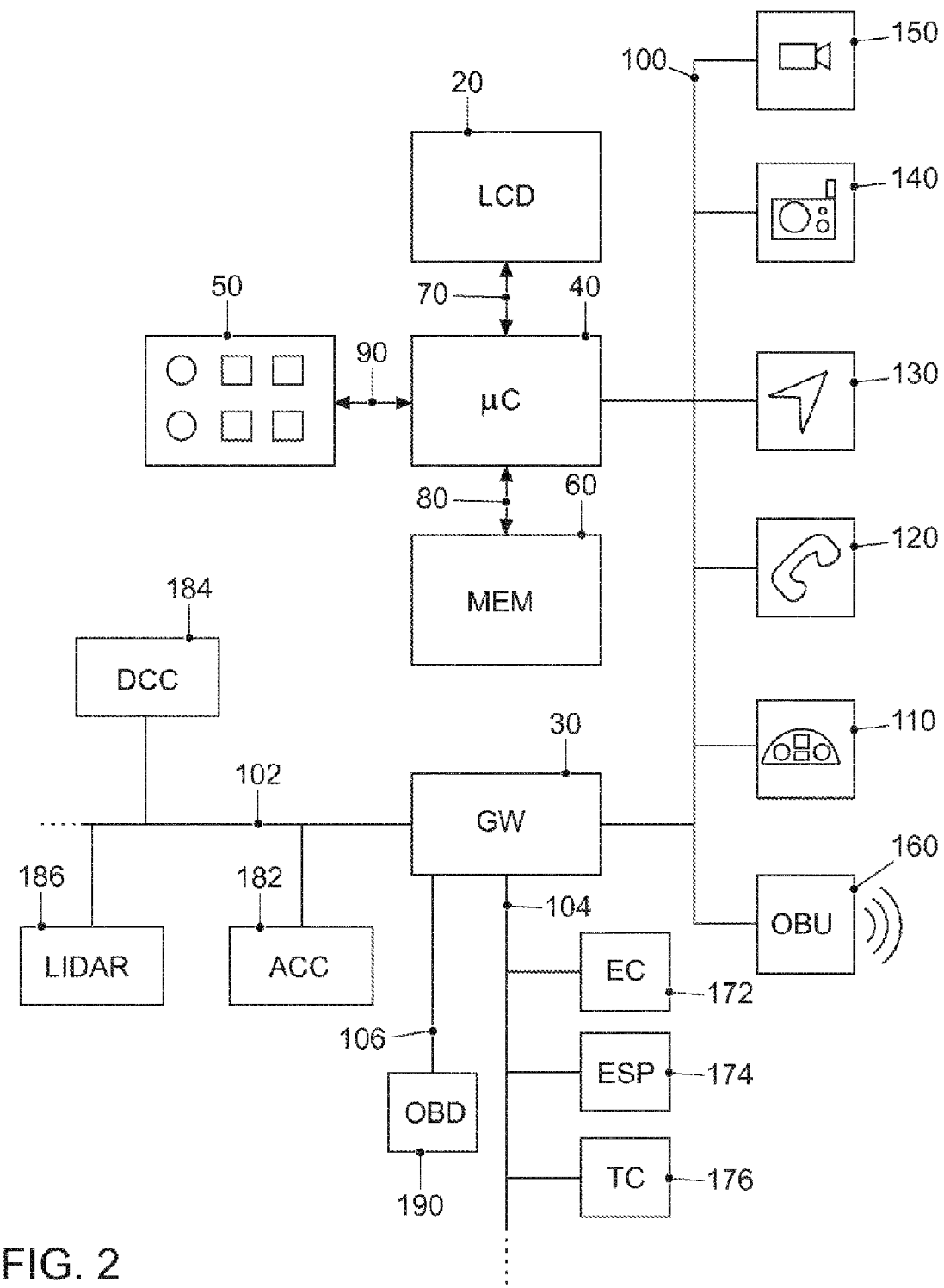
FIG. 2 shows a typical block diagram of the automotive electronics of the transportation vehicle.

FIG. 2 shows schematically a block diagram of the automotive electronics and, by way of example, some subsystems or applications of the infotainment system. Along with further components, the infotainment system comprises: the touch-sensitive display unit 20, a computing device 40, an input unit 50 and a memory 60. The display unit 20 comprises both a display area for displaying variable graphical information and a user interface (touch-sensitive layer) arranged above the display area for the input of commands by a user.

The display unit 20 is connected via a data line 70 to the computing unit 40. The data line can be designed according to the LVDS standard, corresponding to Low Voltage Differential Signaling. The display unit 20 receives control data from the computing device 40 via the data line 70 to control the display area of the touch screen 20. Control data of the entered commands are also transmitted via the data line 70 from the touchscreen 20 to the computing device 40. The input unit is denoted by the reference number 50. The operating elements already mentioned, such as buttons, rotary controls, slide controls or rotary/push-button controls by which the operating person can make inputs via the menu guidance are associated with the input unit. The term "input"
is generally understood to mean entering a selected menu option, and also modifying a parameter, activating and deactivating a function, etc.

The storage device 60 is connected via a data line 80 to the computing unit 40. A pictogram directory and/or symbol directory is/are stored in the memory 60 with the pictograms and/or symbols for possible displays of additional information.

The further components of the infotainment system, i.e., the camera 150, radio 140, navigation device 130, telephone 120 and instrument cluster 110 are connected via the data bus 100 to the device for the operation of the infotainment system. The high-speed option of the CAN bus according to the ISO 11898-2 standard can be considered as the data bus 100. Alternatively, for example, the use of a bus system based on Ethernet technology, such as IEEE 802.03cg, could also be considered. Bus systems in which the data transmission takes place via optical waveguides are also usable. The MOST (Media Oriented System Transport) bus or the D2B (Domestic Digital Bus) are mentioned as examples. The transportation vehicle 10 is equipped with the already mentioned communication module 160 for wireless internal and external communication. It can be designed for mobile radiocommunication, e.g., according to the LTE Standard, corresponding to Long Term Evolution. It can similarly be designed for WLAN communication, corresponding to Wireless LAN, either for communication with devices of the occupants of the transportation vehicle or for a vehicle-to-vehicle communication implemented via WLAN-p.

The communication bus 100 of the infotainment system is connected to a gateway 30. The other parts of the automotive electronics are also connected thereto. On the one hand, this concerns the communication bus 104 of the powertrain which is typically implemented as the CAN bus. The control units of the powertrain, i.e., the engine control unit 172, the ESP control unit 174 and the transmission control unit 176 are mentioned and shown as examples. This further concerns the communication bus 102 for driver assistance systems which can be designed as the FlexRay bus. Two driver assistance systems are shown: a driver assistance system 182 for adaptive cruise control ACC, a driver assistance system 184 for Dynamic Chassis Control DCC, and a LIDAR (Light Detection and Ranging) sensor 186. Furthermore, a communication bus 106 is also connected to the gateway 30. This bus connects the gateway 30 to an on-board diagnostic interface 190. The gateway 30 is responsible for performing the format conversions for the different communication systems 100, 102, 104, 106 so that the systems can exchange data with one another. In the example embodiment shown, the driver assistance system DCC makes use of a very precise map of the surrounding area for the driving task. In a first disclosed embodiment, the map of the surrounding area can be stored in advance in a memory of the driver assistance system DCC. For this purpose, it is normally loaded via the communication module 160, forwarded from the gateway 30 and written to the memory of the driver assistance system 184. In a different option, only a section of a map of the surrounding area is loaded and written to the memory of the driver assistance system. This enables a smaller memory to be provided in the driver assistance system 184 and reduces costs.

The transportation vehicles A, B are equipped with the two environment sensors: the video camera 150 and the LIDAR sensor 186. Even a plurality of video cameras 150 (front camera, rear camera, side camera left, side camera right) are typically installed in the transportation vehicle 10. It is thus possible to generate an all-round view of the transportation vehicle 10 through image processing. The LIDAR sensor 186 is typically installed in the front area of the transportation vehicle 10 and detects the surrounding area in the direction of travel of the transportation vehicle A, B. In addition, ultrasound sensors and RADAR sensors could also be used.

The aforementioned environment sensors which are capable of detecting the surrounding area of the transportation vehicle are to be used for different distances and different purposes. The following indications of range and purpose generally apply:

- A stereo camera, range 500 m, serves to capture a 3D map, used for an automatic emergency braking assistant, lane change assistant, for traffic sign recognition and an ACC stop and go.
- Camera, range 100 m, serves to capture a 3D map, used for an automatic emergency braking assistant, lane change assistant, for traffic sign recognition, an ACC stop and go, for frontal collision warning, automatic light control and a parking assistant.
- Ultrasound sensor, range <10 m, parking assistant.
- Radar sensor, range 20 cm to 100 m, used for an automatic emergency braking assistant, for automatic speed control, an ACC stop and go, a blind spot assistant, a cross-traffic alarm transmitter.
- Lidar sensor, range 100 m, serves to capture a 3D map, used for an automatic emergency braking assistant.

Figure 3:
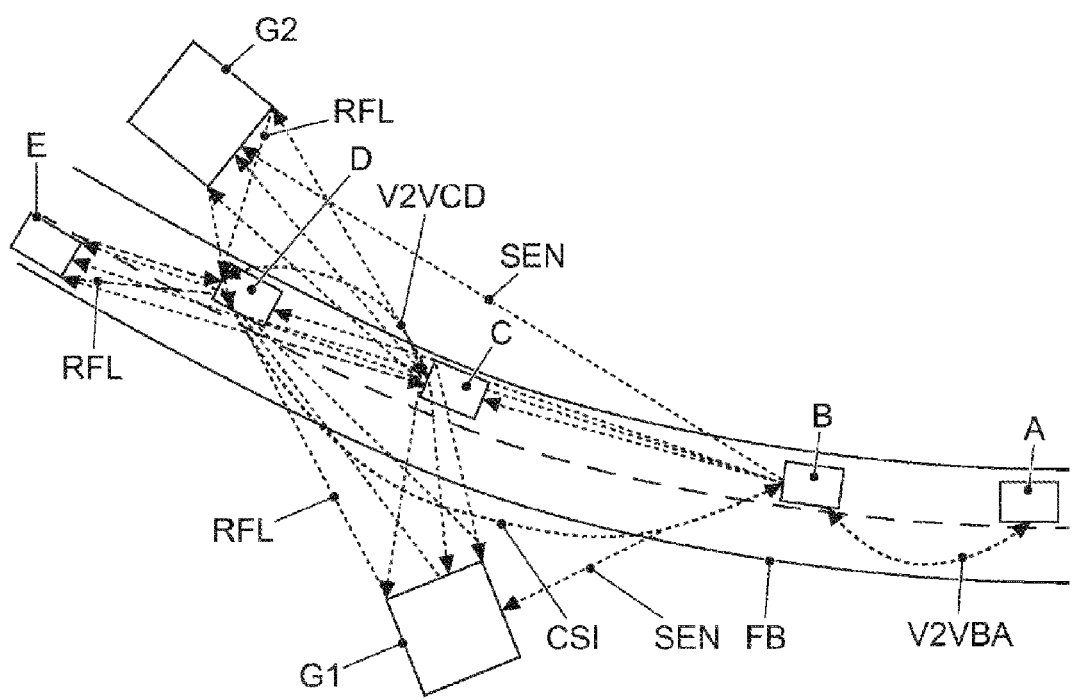
FIG. 3 is an illustration explaining the process of estimating the future transmission conditions for a planned vehicle-to-vehicle communication.

FIG. 3 is an illustration explaining the process of estimating the future transmission conditions for a planned vehicle-to-vehicle communication. Different applications exist in which such a planned vehicle-to-vehicle communication can be used. A notable example can be found in the application of platooning.

Increasing numbers of logistics companies are seeking technical solutions for saving fuel and increasing traffic safety for their company trucks. The driving of trucks (or vehicles, in general) in a platoon offers the facility to reduce fuel consumption by shortening the distances between transportation vehicles which travel together in a platoon. A direct relationship exists between the distance separating the platoon vehicles and the reduction in fuel consumption and therefore costs also.

The challenge lies in minimizing the distance between the transportation vehicles in a platoon. This requires a distance regulation with a precise and reliable reference for the relative distance measurement between two transportation vehicles driving one behind the other in a platoon. A plurality or even a large number of transportation vehicles are controlled in a coordinated manner by a technical control system so that they can drive at a very short distance one behind the other without compromising traffic safety. Particularly in the case of trucks, this results in a substantial reduction in fuel consumption and a substantial reduction in greenhouse gases. However, this application is particularly safety-critical. It must be guaranteed at all times that the transportation vehicles in the column can stop. The braking procedure is coordinated so that all transportation vehicles brake simultaneously to avoid problems ranging from a shifting of the cargo through to collisions. Vehicle-to-vehicle communication is used for this purpose. It is therefore necessary for the transportation vehicles to be able to exchange safety-relevant data with high reliability. It is therefore proposed that the transportation vehicles periodically estimate for a specific time period, e.g., a few seconds, whether the transmission conditions are still good enough for the planned application.

This is also relevant to other applications. For example, the example of a map update or a software update can be mentioned as an example of a further application. It is already obvious for these applications when they started that they require more time. It is then similarly important to obtain an estimation in advance concerning the transmission conditions.

In FIG. 3, the reference FB denotes a road having two lanes for one direction. The two transportation vehicles B and A are moving in the right-hand lane on the road FB at a typical distance, e.g., 25 m one behind the other. Vehicle-to-vehicle communication V2VBA takes place between these two transportation vehicles for a cooperative driving procedure. The application can again relate to the example of platooning where the transportation vehicles cooperate in such a way that they drive along at the shortest possible distance one behind the other. The transportation vehicles B, A exchange information with one another indicating the speed at which they are in each case intended to drive to reduce the distance. The data exchange will take place here over a lengthy period of time so that it is necessary to estimate the transmission conditions in advance.

The transportation vehicle driving in front monitors the surrounding area in front of it for this purpose. This can be done with either the video camera 150 or the LIDAR sensor 186 or both sensors in combination. Image data are supplied by both sensors and are then evaluated with corresponding object detection algorithms. These algorithms are assumed to be known to the person skilled in the art. As shown in FIG. 3, the evaluation indicates that the transportation vehicles C, D are driving in front and that the taller buildings G1 and G2 to the left and right of the road are positioned in the driving segment located in front. The monitoring of the transportation vehicles C, D driving in front and the buildings G1 and G2 positioned in front is indicated in FIG. 3 by the reference SEN. The transportation vehicle B can similarly determine the distance at which the transportation vehicles D and C are driving along one behind the other. This can similarly be estimated through image processing, wherein the known dimensions of the transportation vehicles are related to the determined distance between them. In mathematical terms, the theorem of intersecting lines offers an appropriate calculation basis. Alternatively, the distance could also be measured by the transportation vehicles C, D driving in front and could be reported to the following transportation vehicle B via a vehicle-to-vehicle communication. In the case of high traffic density, it is usually automatically the case that the transportation vehicles drive along in columns at a relatively similar distance one behind the other. In vehicle-to-vehicle communication, the transmission conditions depend very heavily on the distance at which the transportation vehicles communicating directly with one another drive along one behind the other. The actual transmission conditions are defined for each direct vehicle communication. "CSI reporting" is used for this purpose in LTE.

CSI stands for Channel Status Information. As the name already suggests, it is a type of indicator describing how good or how poor the transmission channel is at a specific time. The CSI information essentially consists of three main components:

- CQI (Channel Quality Indicator)
- PMI (Precoding Matrix Index)
- RI (Rank Indicator).

Not all of these indicators are measured for every CSI report. Depending on the situation and configuration from the network, the user stations perform different combinations of measurements. However, this is known and will not be explained here in more detail.

If the two transportation vehicles C and D driving in front are now driving along at a distance one behind the other that is similar to that of the two transportation vehicles B and A, the CSI information is intended to be used for the vehicle-to-vehicle communication according to the method proposed here to improve the prediction of the transmission conditions for the two communicating transportation vehicles B, A. The vehicle-to-vehicle communication between the transportation vehicles C, D is denoted in FIG. 3 by the reference V2VCD. This takes place as follows.

The transportation vehicle B first determines the distance to the transportation vehicle C driving in front. The same technique can be used for this purpose as for determining the distance between the transportation vehicles C and D. The transportation vehicle's own speed is known to the transportation vehicle B. It will then determine the time t that it requires to cover the distance S at its own speed v from the known formula S=v*t. This time t then corresponds to the prediction time for which it will predict the transmission conditions. However, it will not only simply adopt the measured values from the transportation vehicles C, D driving in front and use them as its own estimation. It will also make a prediction of its own for the future transmission conditions from the sensor-based monitoring of the surroundings. It is known in principle how this estimation can be performed as precisely as possible. This approach is based very strongly on the monitoring of the surroundings. The objects located in front are determined. This concerns the two static objects G1 and G2 and the moving objects C, D, E. Transportation vehicle B then predicts where it will be located at the determined time and predicts whether it will be adversely affected by signal reflections due to its own transmitted emissions or the emissions from the transportation vehicles surrounding it. Its present location in the vicinity of transportation vehicle B is estimated by motion trajectories of the transportation vehicles. For the transportation vehicle E, it is determined that it will be located at the desired time at the position shown in FIG. 3. The surrounding objects are divided into static objects and dynamic objects. The dynamic objects are then the transportation vehicles A, B, E. The static objects are the buildings G1 and G2. An environment modelling is therefore performed. It is then calculated whether the risk of signal interference arises at least from the transportation vehicle's own emissions of signals for the vehicle-to-vehicle communication due to reflections which are backscattered from the detected objects in the surrounding area. If so, the transmission conditions are estimated as correspondingly poorer. The possible reflections are drawn in FIG. 3 and are denoted by reference RFL. At the high frequencies in the 5 GHz range which are used for direct vehicle communication, straight-line propagation can be assumed and the simple laws of reflection can be applied to calculate the direction of the reflections.

Finally, with this information, the transportation vehicles A and B can estimate whether the planned transmissions for the predicted time will be affected by interference due to reflections of the transportation vehicle's own emissions. The transportation vehicles C and D will in fact leave the position shown in FIG. 3 and the analysis may indicate that their reflections will no longer interfere with the transportation vehicle's own emissions. This provides a future estimation of the transmission conditions based on the sensor-based monitoring of the surroundings and the transportation vehicle's own evaluations.

Further details of the technology of sensor-based prediction of transmission conditions are known from the publication entitled "Sensor-Based Predictive Communication for Highly Dynamic Multi-Hop Vehicular Networks" by Roman Alieiev, Jiri Blumenstein, Roman Maralek, Thorsten Hehn, Andreas Kwoczek, and Thomas Kilmer in 2017 25th European Signal Processing Conference (EUSIPCO).

However, according to the proposal, the determined transmission conditions of transportation vehicles driving in front which already assume the future position in advance are additionally used to further improve the accuracy of the estimation of the transmission conditions.

Figure 4:
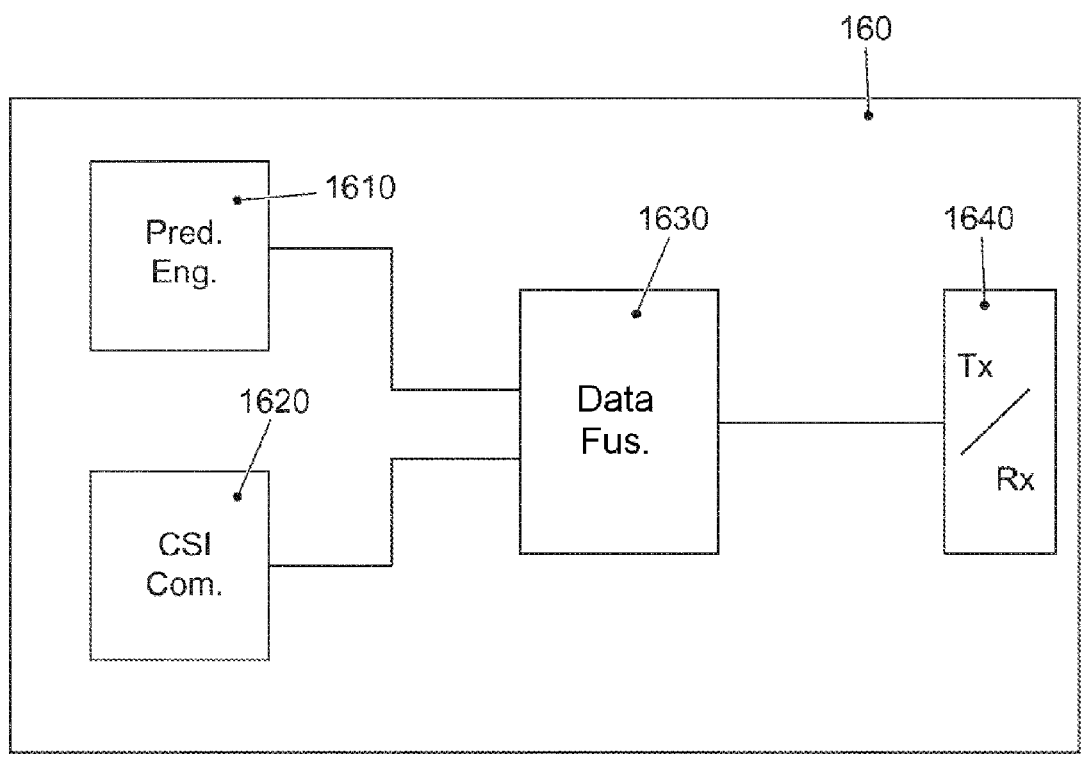
FIG. 4 shows a block diagram for the function of estimating the future transmission conditions in relation to a vehicle-to-vehicle communication.

The block diagram in FIG. 4 shows the interplay of different components of an on-board connectivity unit 160 which are, however, typically implemented as different program parts of adapted software or a combination of software and hardware. The OCU 160 is equipped with a correspondingly powerful computer unit.

Reference number 1610 denotes the prediction unit which makes the prediction relating to the transmission conditions on the basis of its own sensor information. The mode of operation of this prediction unit has already been explained in detail.

Reference number 1620 denotes a communication unit which is responsible for the communication with the transportation vehicles C, D driving in front. For this purpose, the communication unit 1620 obtains information from the prediction unit 1610 relating to the identity of the communication partners C, D driving in front which are relevant to the prediction of the transmission conditions. The communication unit 1620 then forms a request message for the transportation vehicle D which is transmitted via the transceiver unit 1640 via vehicle-to-vehicle communication to the transportation vehicle D. The transportation vehicle D then transmits its CSI report relating to the communication to transportation vehicle C, as already described above. Transportation vehicle D can transmit the report once, multiple times or simply periodically only, without having to be prompted to do so in advance. In the option where transportation vehicle D periodically transmits the CSI report, the transmission of the request message by transportation vehicle B can even be omitted.

Once this information is present in the transportation vehicle B, both independent information elements relating to the prediction of the transmission conditions are merged in the data fusion unit 1630. The known technique of data fusion is used for this purpose. The accuracy of the prediction of the transmission conditions for planned communication between transportation vehicles A and B is again substantially increased.

In at least one disclosed embodiment, a check is also carried out before the operation of performing the data fusion in the fusion unit to determine whether the individual results of the transmission conditions estimated multiple times in succession by the prediction unit 1610 converge. The same check is carried out for the transmission conditions transmitted multiple times in succession by transportation vehicle D. The data fusion is then carried out only if the measurement sequences converge in both cases.

It is in any event obvious why the data fusion will result in a greater accuracy. The prediction made by the prediction unit 1610 already includes the influence of the transportation vehicle E predicted for the prediction time. The latter is not present in the actual measurement of the transportation vehicle D. However, the actual conditions are measured and the errors in the environment modelling and movement estimation are avoided.

All examples mentioned herein and also conditional wordings are to be understood without restriction to such specifically cited examples. It will thus be acknowledged by person skilled in the art, for example, that the block diagram shown here represents a conceptual view of an example of a circuit arrangement. Similarly, it is to be recognized that an illustrated flow diagram, state transition diagram, pseudo-code and the like represent different options for representing processes which are essentially stored in computer-readable media and can therefore be executed by a computer or processor.

It should be understood that the proposed method and the associated devices can be implemented in various forms of hardware, software, firmware, special processors or a combination thereof. Special processors may comprise Application-Specific Integrated Circuits (ASICs), Reduced Instruction Set Computers (RISC) and/or Field Programmable Gate Arrays (FPGAs). The proposed method and the device may be implemented as a combination of hardware and software. The software may be installed as an application program on a program storage device. This typically involves a machine based on a computer platform which has hardware, such as, for example, one or more central units (CPU), a random-access memory (RAM) and one or more input/output (I/O) interfaces. Furthermore, an operating system is typically installed on the computer platform. The different processes and functions that have been described here may form part of the application program, or a part which is run via the operating system.

The disclosure is not limited to the example embodiments described here. There is scope for various adaptations and modifications which the person skilled in the art, due to his technical knowledge, would also consider as belonging to the disclosure.

REFERENCE NUMBER LIST

20 Touchscreen
30 Gateway
40 Computing unit
50 Input unit
60 Storage unit
70 Data line to the display unit
80 Data line to the storage unit
90 Data line to the input unit
100 1st data bus
102 2nd data bus
104 3rd data bus
106 4th data bus
110 Instrument cluster
120 Telephone
130 Navigation device
140 Radio
150 Camera
160 Communication module
172 Engine control unit
174 ESP control unit
176 Transmission control unit
182 ACC control unit
184 Chassis control unit
186 Lidar sensor
190 On-board unit diagnostic connector
200 Mobile radiocommunication base station
300 Evolved Packet Core
400 Internet
410 Backend central computer
1610 Prediction unit
1620 CSI communication unit
1630 Fusion unit
1640 Transceiver unit
A-E Transportation vehicles
G1, G2 Buildings
FB Road
V2VBA Vehicle-to-vehicle communication
V2VCD Vehicle-to-vehicle communication
CSI CSI communication
RFL Signal reflection
SEN Object detection through sensor monitoring

The invention claimed is:

1. A method for predictively estimating communication transmission conditions for communication between a pair of communication partners moving along a road as part of facilitating cooperative operation of the communication partner pair relative to one another, the method comprising:
  receiving previously estimated communication transmission conditions from at least one communication partner that is part of at least one of a plurality of other communication partner pairs moving in front of the communication partner pair, wherein the previously estimated communication transmission conditions were previously estimated by the at least one communication partner that is part of the at least one of the plurality of other communication pairs;
  predictively estimating present communication transmission conditions for communication between the communication partner pair based on the received communication transmission conditions,
  wherein cooperative operation of the communication partner pair is facilitated based on the predicted, estimated communication transmission conditions for the communication partner pair.

2. The method of claim 1, further comprising:
  at least one of the communication partners of the communication partner pair performing sensor-based monitoring of surroundings; and
  following the sensor-based monitoring of the surroundings, the at least one communication partner of the communication partner pair determining whether similar boundary conditions are present for direct vehicle communication between the plurality of other communication partner pairs driving in front of the communication partner pair.

3. The method of claim 2, further comprising the at least one of the communication partners of the communication partner pair determining whether the communication partners of the plurality of other communication partner pairs are moving relative to one another at a similar distance to the communication partner pair based on sensor-based monitoring of the environment.

4. The method of claim 3, further comprising the at least one communication partner of the communication partner pair prompting at least one communication partner of at least one of the plurality of other communication partner pairs moving in front, via a request message, to report the previously estimated communication transmission conditions to the communication partner pair in response to the at least one communication partner of the communication partner pair determining that the plurality of other communication partner pair is moving at a similar distance to the communication partner pair.

5. The method of claim 1, wherein the at least one communication partner that is part of the at least one of the plurality of other communication partner pairs reports the estimated present communication transmission conditions periodically to the communication partner pair.

6. The method of claim 2, further comprising, following the sensor-based monitoring of the surroundings, the at least one communication partner of the communication partner pair determines at least distance to the plurality of other communication partner pairs and calculates time therefrom for which the estimated communication transmission conditions have been predicted.

7. The method of claim 2, further comprising, following the sensor-based monitoring of the surroundings, the at least one communication partner of the communication partner pair determines possible problems with signal scatter and performs the estimation of the predicted, estimated communication transmission conditions taking into account the determined signal scatter.

8. The method of claim 7, wherein the estimation of the predicted communication transmission conditions for the communication partner pair further comprises the at least one communication partner of the communication partner pair consolidating the communication transmission conditions which it has estimated based on the predicted, estimated communication transmission conditions previously estimated and reported by the other communication partners that are part of the plurality of other communication partner pairs.

9. The method of claim 8, wherein the consolidation is carried out only in response to:
the at least one communication partner of the communication partner pair estimating the predicted, estimation of communication transmission conditions multiple times in succession and determining that the predicted estimation of communication transmission conditions which it has estimated multiple times converge, and also
the at least one communication partner of the communication partner pair determining that the previously estimated communication transmission conditions reported multiple times in succession by other communication partners that are part of at least one communication partner pair of the plurality of other communication partner pairs converge.

10. A device configured to predictively estimate communication transmission conditions for communication between a pair of communication partners moving along a road as part of facilitating cooperative operation of the communication partner pair relative to one another, the device comprising:
an interface configured to receive previously estimated communication transmission conditions from at least one communication partner that is part of at least one of a plurality of other communication partner pairs moving in front of the communication partner pair, wherein the previously estimated communication transmission conditions were previously estimated by the at least one communication partner that is part of the at least one of the plurality of other communication pairs;
at least one processor configured to predictively estimate present communication transmission conditions for the communication partner pair based on the received communication transmission conditions,
wherein cooperative operation of the communication partner pair is facilitated based on the predicted, estimated communication transmission conditions for the communication partner pair.

11. A transportation vehicle, wherein the transportation vehicle comprises the device of claim 10.

12. A non-transitory computer program having a program code which, when executed in a processor device, performs the method of claim 1.

13. The device of claim 10, wherein the processor is further configured to perform sensor-based monitoring of surroundings and, following the sensor-based monitoring of the surroundings, determine whether similar boundary conditions are present for direct vehicle communication between the plurality of other communication partner pairs driving in front of the communication partner pair.

14. The device of claim 13, wherein the processor is further configured to determine whether the communication partners of the plurality of other communication partner pairs are moving relative to one another at a similar distance to the communication partner pair based on sensor-based monitoring of the environment.

15. The device of claim 14, wherein the processor is further configured to control prompting of at least one of at least one communication partner of at least one of the plurality of other communication partner pairs moving in front, via a request message, to report the previously estimated communication transmission conditions to the communication partner pair in response to the at least one communication partner of the communication partner pair determining that the plurality of other communication partner pair is moving at a similar distance to the communication partner pair.

16. The device of claim 10, wherein the processor is further configured to receive the estimated present communication transmission conditions periodically from one of the communication partners of at least one of the communication partner pairs of the plurality of other communication partner pairs.

17. The device of claim 13, wherein the processor is further configured to, following the sensor-based monitoring, determine at least distance to the plurality of other communication partner pairs and calculate time therefrom for which the estimated communication transmission conditions have been predicted.

18. The device of claim 13, wherein the processor is further configured to, following the sensor-based monitoring of the surroundings, determine possible problems with signal scatter and perform estimation of the predicted, estimated communication transmission conditions taking into account the determined signal scatter.

19. The device of claim 18, wherein the processor is configured estimate the predicted communication transmission conditions for the communication partner pair by consolidating the communication transmission conditions which it has estimated based on the previously estimated communication transmission conditions reported by other communication partners that are part of the plurality of other communication partner pairs.

20. The device of claim 19, wherein the processor is further configured to perform the consolidation only in response to:
the predicted, estimation of communication transmission conditions estimated multiple times in succession being determined; and also
the previously estimated communication transmission conditions reported multiple times in succession by other communication partners that are part of at least one communication partner pair of the plurality of other communication partner pairs converge.

* * * * *